Aug. 11, 1925.
S. B. WINN
1,548,967
TRACTOR TRAILER COMBINATION
Filed Jan. 8, 1923   6 Sheets-Sheet 5
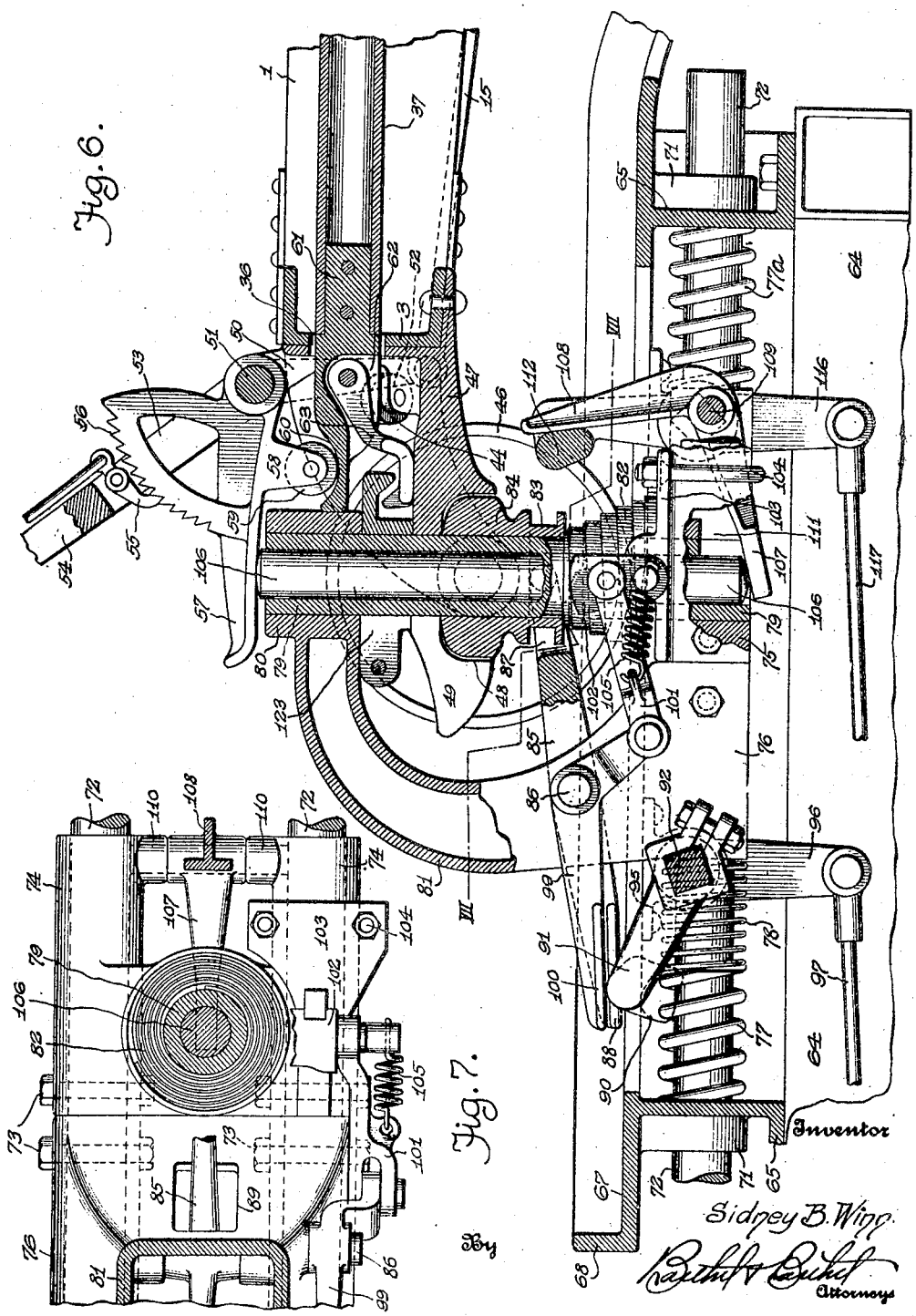
Inventor
Sidney B. Winn
By
Attorneys Aug. 11, 1925.

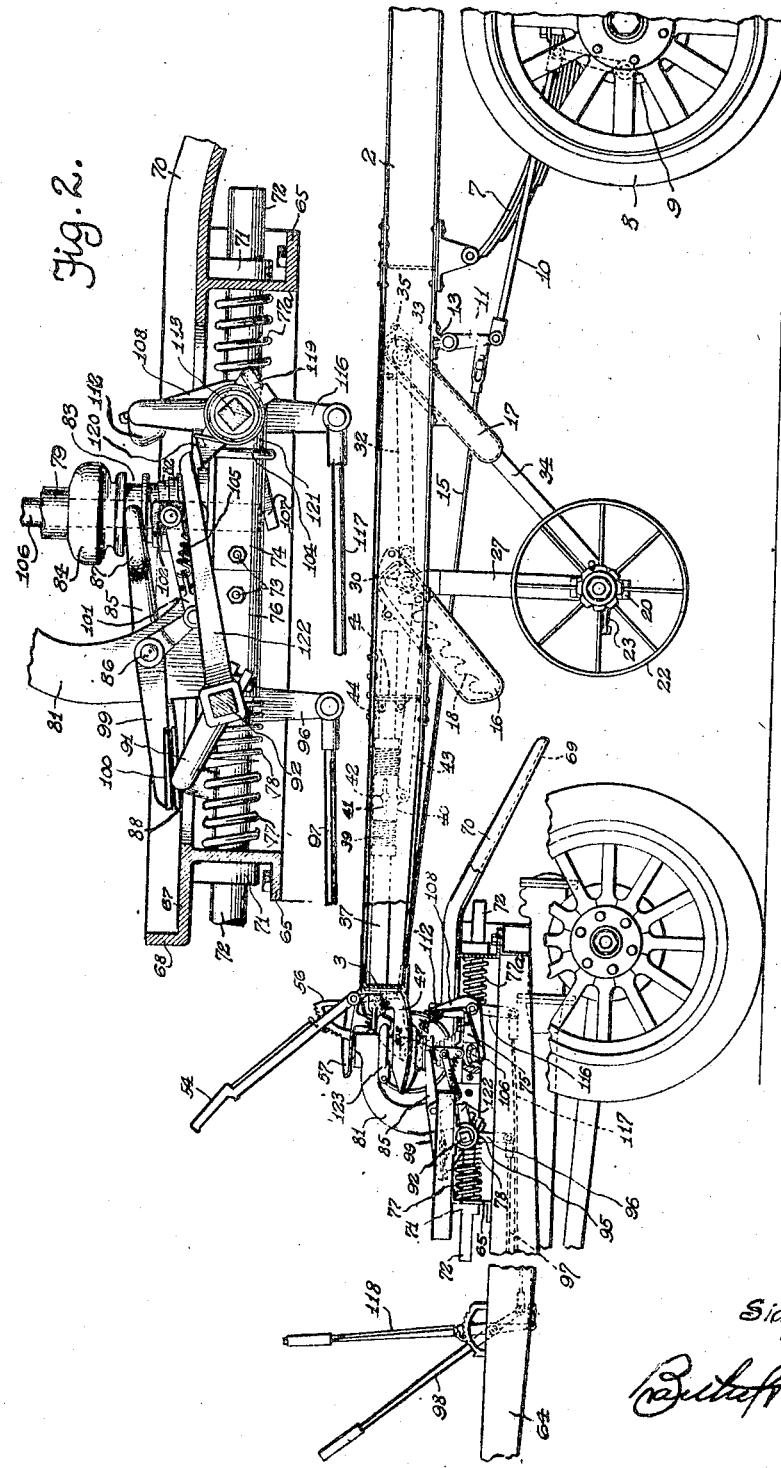

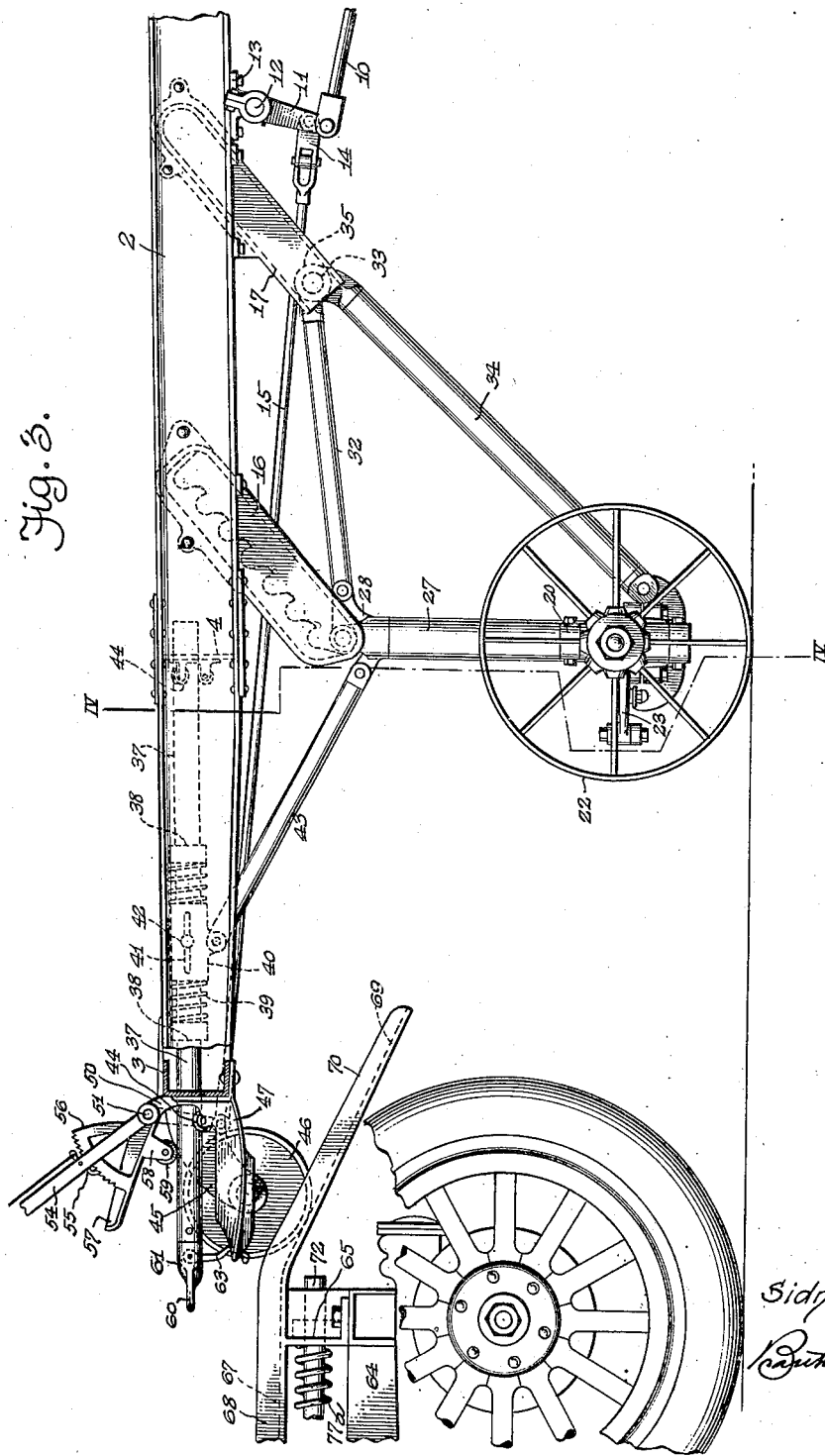

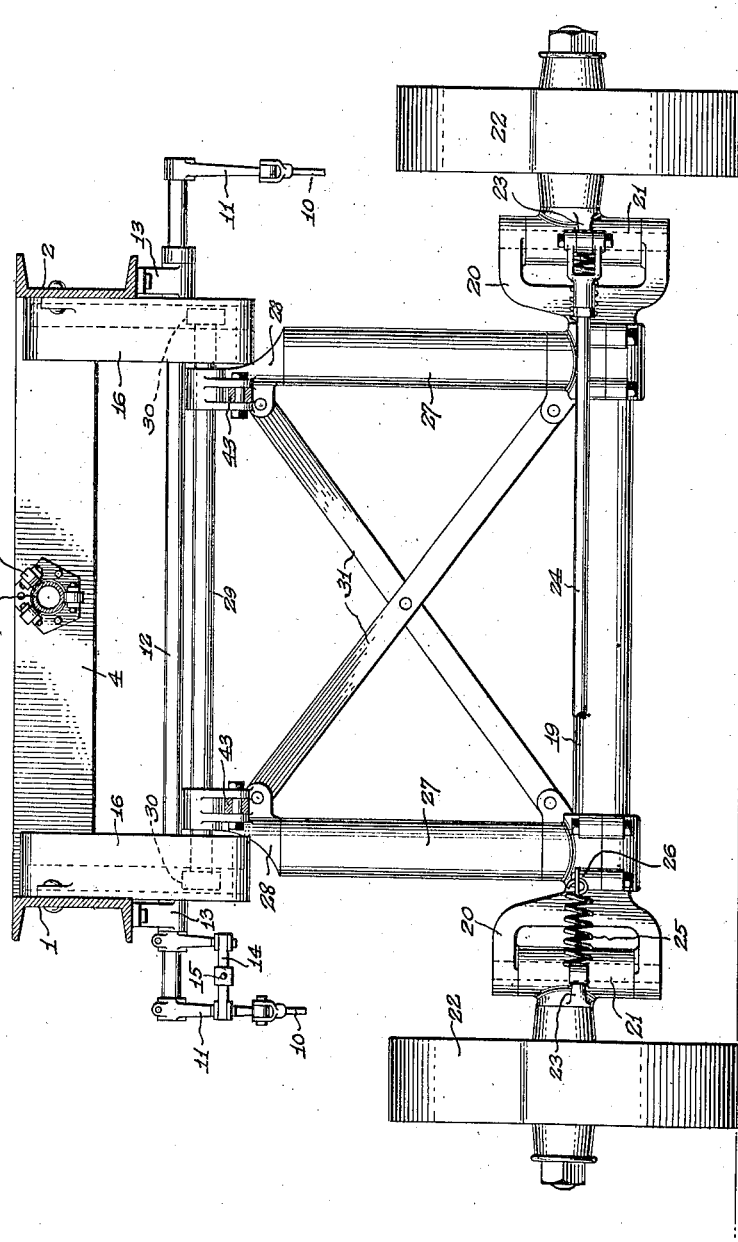

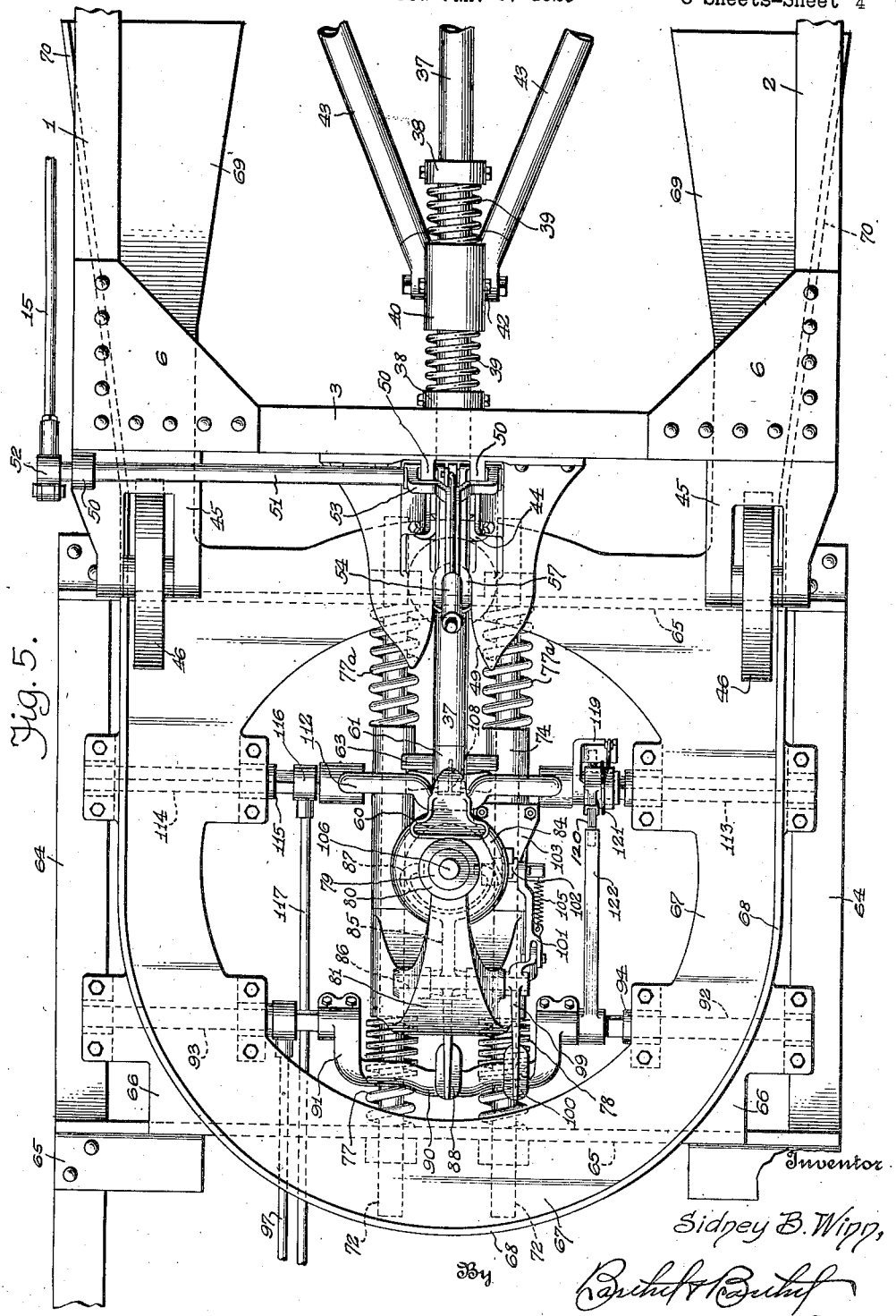

S. B. WINN 1,548,967

TRACTOR TRAILER COMBINATION

Filed Jan. 8, 1923     6 Sheets-Sheet 6

Inventor
Sidney B. Winn,

Attorneys

Patented Aug. 11, 1925.

1,548,967

UNITED STATES PATENT OFFICE.

SIDNEY B. WINN, OF LAPEER, MICHIGAN.

TRACTOR TRAILER COMBINATION.

Application filed January 8, 1923. Serial No. 611,319.

*To all whom it may concern:*

Be it known that I, SIDNEY B. WINN, a citizen of the United States of America, residing at Lapeer, in the county of Lapeer and State of Michigan, have invented certain new and useful Improvements in Tractor Trailer Combinations, of which the following is a specification, reference being had therein to the accompanying drawings.

This invention relates to a tractor trailer combination and as examples of the art there are my Patents No. 1,249,705 granted Dec. 11, 1917, on a trailer attachment; No. 1,316,660, granted Sept. 23, 1919, on a trailer attachment for vehicles; No. 1,316,661, granted Sept. 23, 1919, on a trailer; No. 1,346,927, granted July 20, 1920, on a trailer; No. 1,372,922, granted Mar. 29, 1921, on a locking device for tractor etc., and No. 1,378,749, granted May 17, 1921, on trailer braking means for trucks.

This invention also has special reference to my tractor trailer combination disclosed by my pending application filed April 19, 1920, Ser. No. 374,889, an application filed May 28, 1920, Ser. No. 384,946, and another application filed May 25, 1920, Ser. No. 384,947.

Briefly reviewing my prior patents and the subject matter of my pending applications, there is a trailer adapted to have its forward end supported on and attached to the rear end of a tractor or truck, and the trailer has a shiftable supporting leg and brake mechanism so that the forward end of the trailer may be safely supported, with the brakes applied, when not supported on the tractor. With the brakes released the trailer may be moved about and the brake mechanism is such that it may be controlled from the tractor when the trailer is attached thereto. The tractor includes, among other things, a track to facilitate placing the forward end of the trailer on the rear end of the tractor; a turn-table to permit of the tractor turning relative to the trailer, coupling mechanism by which the forward end of the trailer may be connected to the rear end of the tractor; a draft mechanism establishing a yieldable connection between the tractor and trailer; a mechanism operable by the tractor for shifting the supporting leg of the trailer, and a mechanism operable from the tractor for controlling the brakes of the trailer.

This invention has special reference to certain improvements and refinement of my prior inventions and the improvements and refinements may be characterized in the following particulars.

First, the coupling mechanism between the tractor and trailer includes a reciprocable coupling head that may be easily and quickly shifted, by mechanism on the tractor, to release the trailer so that the tractor may pull away from the trailer. Associated with the coupling head and its shifting mechanism is a safety device which prevents accidental reciprocation of the coupling head, consequently jarring and vibrations of the trailer or tractor, relative to each other, cannot cause an uncoupling of the two vehicles and accidents incident to such uncoupling.

Second, the trailer has a shiftable substantially braced leg which lowers by gravity and becomes automatically locked in a lowered position when the tractor pulls away from the trailer, and in coupling the tractor to the trailer the supporting leg is automatically raised so as not to interfere with movement of the trailer by the tractor.

Third, the tractor has a brake controlling mechanism operatable through the tractor trailer coupling means for setting or releasing the brakes of the trailer, and associated with the tractor brake mechanism is a safety device by which the brake mechanism locks the uncoupling mechanism, thus precluding any danger of the tractor being accidentally uncoupled and pulled from under the trailer. The brake operating mechanism of the tractor is related to the draft appliance thereof so that any tendency of the trailer to crowd or push the tractor, when descending a grade, or stopping the tractor, causes the brakes of the trailer to be applied and thus retard the action of the trailer relative to the tractor, and this automatic braking is advantageous when stopping the tractor or when encountering irregular roads. Forming part of the brake operating mechanism of the trailer are means by which the brakes of the trailer may be adjusted independent of the brake operating mechanism of the tractor, and such means also permits of the brakes of the trailer being maintained set during an uncoupling operation and thereafter, until the brakes are either manually released or automatically released by coupling the tractor to the trailer.

Fifth, in putting this invention into practice the various mechanisms have been designed to insure the requisite flexibility between the tractor and trailer so essential because of road and operating conditions, some of which will be hereinafter referred to when considering the construction and purpose of the different mechanisms.

Reference will now be had to the drawings, wherein—

Figure 1 is a side elevation of a portion of a tractor trailer combination in accordance with my invention;

Fig. 2 is an enlarged longitudinal sectional view, partly in elevation of a portion of the tractor equipment, showing the manner in which the brake mechanism locks the uncoupling mechanism;

Fig. 3 is an enlarged side elevation of the forward end of the trailer showing how the rear end of the tractor can elevate such forward end;

Fig. 4 is a cross sectional view of the trailer taken on the line IV—IV of Fig. 3, showing the construction of the supporting leg;

Fig. 5 is an enlarged plan of a portion of the tractor trailer combination showing the rear end of the tractor partially backed under the forward end of the trailer and the tractor and trailer about to be coupled;

Fig. 6 is an enlarged longitudinal sectional view of the tractor trailer coupling mechanism showing the tractor coupled to the trailer;

Fig. 7 is a horizontal sectional view taken on the line VII—VII of Fig. 6, and

Figure 8:
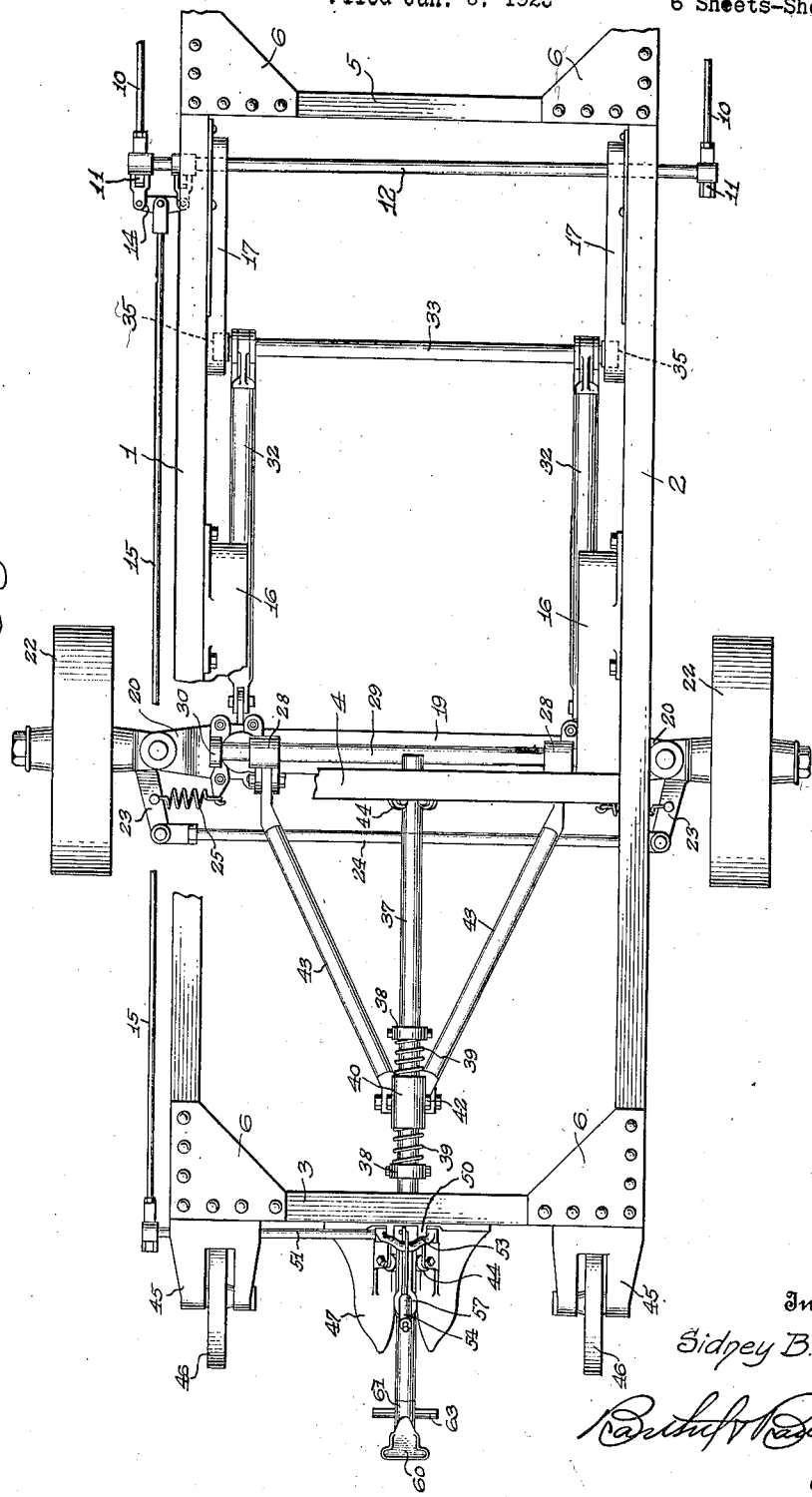
Fig. 8 is a plan of the trailer, partly broken away.

Considering the trailer, Figs. 1, 3, 4 and 8, the chassis or main frame of the trailer is composed of longitudinal parallel channel members 1 and 2 connected by transverse channel members 3, 4 and 5 with gusset plates 6 or other structural parts insuring a rigid chassis or frame.

The rear end of the chassis or frame is supported by suitable springs 7 from a rear axle assembly including ground engaging wheels 8, brake drums 9 and suitable brakes which have not been shown in detail for the reason that such brakes are of a conventional form adapted to be set or released by forwardly extending rods 10 connected to cranks 11 of a transverse rock shaft 12, said shaft being supported in suitable bearings 13 from the channel members 1 and 2. At one end of the rock shaft 12 is an equalizing member 14 connected to a forwardly extending rod 15 arranged in proximity to the channel member 1, and this rod will be hereinafter referred to.

Suitably connected to the inner walls of the channel members 1 and 2 are sets of inclined ways 16 and 17, said inclined ways being inclined downwardly and forwardly with both sets of inclined ways serving as guides for a supporting leg, but the set of inclined ways 16 differing from the set of inclined ways 17 by having a series of notches or ratchet teeth 18 in each of the ways 16 and at the upper inclined walls thereof.

The supporting leg which is guided and held by the inclined ways is composed of an axle 19 provided with forks 20 for knuckles 21 supported from ground engaging wheels 22, and said knuckles have arms 23 connected by a rod 24. The arms 23 are connected by coiled retractile springs 25 to the clamping means 26 of uprights 27 mounted on the axle 19, adjacent the forks 20. The retractile force of the springs 25 will hold the ground engaging wheels 22 in a straight ahead direction, but permit of said wheels laterally swinging when the trailer is being moved other than in a straight direction.

The upper ends of the uprights 27 are provided with heads 28 connected by a transverse shaft 29 extending into the inclined ways 16 and provided with anti-frictional rollers 30 adapted to travel on the lower inclined walls of said ways when the supporting leg is being shifted, and when the supporting leg is in a lowered position sustaining the weight of the forward end of the trailer and any load thereon, the shaft 29 engages in the notches 18 and sustains the weight of the trailer without any load on the rollers 30. In practice, the notches or teeth 18 are at the open sides of the inclined ways 16 and with the anti-frictional rollers 30 between said notches and the outer side walls of the inclined ways 16, the shaft 29 cannot become accidentally displaced relative to the inclined ways. By using a series of notches or teeth 18, the forward end of the trailer may be supported above irregular ground.

The uprights 27 are connected by diagonally disposed braces 31 and connected to the heads 28 of said uprights are rearwardly extending members 32 having the ends thereof mounted on a transverse shaft 33 which is connected to the lower ends of the uprights 27 by angularly disposed members 34, the members 32 and 34 cooperating with the uprights 27 in providing a triangular shaped side frame for the supporting leg. On the ends of the transverse shaft 33 are anti-frictional rollers 35 which travel in the inclined ways 17 and it is by virtue of the inclined ways 16 and 17 that the supporting leg is at all times maintained in an upright position shiftable to and from the trailer chassis and capable of supporting a forward end of the trailer when the trailer is used without the tractor.

The transverse members 3 and 4 of the trailer chassis are provided with longitudinally alining openings 36 providing clearance for a longitudinally disposed tubular locking bar 37 and fixed on said locking bar are collars 38 serving as end abutments for coiled springs 39 encircling the locking bar. Between the coiled springs 39 is a shiftable collar or sleeve 40 having longitudinal slots 41 for a transverse pin 42 carried by the locking bar 37, said pin limiting the longitudinal movement of the collar 40 on the locking bar, besides preventing rotation of the collar thereon. Pivotally connected to the lower face of the yieldable collar 40 are diverging members 43 which have the rear ends thereof pivotally connected to the heads 28 of the supporting leg, and by shifting the locking bar 37 longitudinally of the trailer chassis the supporting leg may be raised or lowered, the raising being accomplished as the tractor is backed under the forward end of the trailer, and the lowering of the supporting leg accomplished by gravity, due to the weight of the leg, and the fact that the leg has its roller 30 supported on inclined ways. To permit of the locking bar 37 being easily shifted anti-frictional rollers 44 are arranged at the transverse channel members 3 and 4 of the trailer chassis.

On the transverse channel member 3 of the trailer chassis, at the sides thereof, are bearings 45 for wheels or casters 46, and suitably attached to the channel member 3, intermediate the ends thereof, is a socket coupling member 47 provided with an opening registering with the opening 36 of the member 3 and supporting the anti-frictional rollers 44 adjacent the member 3. The socket coupling member 47 extends forwardly from the chassis and has its lower face provided with a socket 48. The outer end of the coupling member has a vertical slot 49 with its side walls flared outwardly to form a wide entrance into the coupling member, and the upper and lower faces of the coupling member are beveled or tapered, as best shown in Figs. 3 and 6 so as not to provide any obstruction, as will hereinafter appear.

The socket coupling member 47 and the wheel bearing 45 adjacent the channel member 1 have bearings 50 for a transverse rock shaft 51. On the outer end of the rock shaft 51 is a crank 52 to which the brake operating rod 15 is connected. Fixed on the inner end of the rock shaft 51 is the forked end 53 of a brake lever 54 adapted to be manually shifted, although it may be otherwise shifted, as will hereinafter appear. The brake lever 54 has a conventional form of pivoted locking pawl or dog 55 adapted to be shifted by a hand gripping the handle or upper end of the brake lever and the pawl or dog 55 normally engages a sector rack 56 loose on the rock shaft 51 in the fork 53 of the brake lever 54. The sector rack 56 has a forwardly extending shoe 57 and a depending bearing 58 for an anti-frictional roller 59 adapted to engage in the depressed portion 60 of a head 61 mounted in the forward end of the tubular locking bar 37. When the roller 59 is not engaging in the depression 60 of the head 61, it is bearing on or riding against the upper side of the locking bar 37 and by virtue of the sector rack 56, pawl 55, lever 54 and rock shaft 51 maintaining the brakes set at the rear axle assembly of the trailer.

The head 61 of the locking bar 37 has a comparatively wide forward end serving as an abutment, best shown in Fig. 5, and the lower face of the head 61 has a recess 62 in which is pivotally mounted the inner end of a comparatively wide drag member 63, the purpose of which will hereinafter appear.

The tractor or truck includes the usual front and rear axle assemblies, a power plant, a cab and other parts not shown, but for the purpose of illustrating my invention I show longitudinal chassis members or frames 64 connected by transverse members 65, and mounted on the members 65 and the frames 64 are the lateral flanges 66 of a stationary turn table or platform 67 on which the trailer wheels or casters 46 are adapted to rest or ride when turning the tractor relative to the trailer or when the tractor trailer combinaton is moving over a curved section of road. The turn table or platform 67 has an outer upstanding wall or flange 68 and at the rear end of said turn table or platform are downwardly inclined rails 69 having outer walls or flanges 70 as a continuation of the wall or flange 68 of the platform. The rails 69 overhang the rear end of the tractor and provide an inclined track which may be backed under the forward end of the trailer to cause the wheels or casters 46 to ascend the rails and pass on to the turn table or platform 67.

The transverse members 65 have sets of longitudinally alining bearings 71 in which slide rods 72 form a part of the draft appliance and mounted on said rods and fixed thereto by nut equipped bolts 73 are the sleeve portions 74 of supports 75 and 76. Encircling the rods 72, between the transverse members 65 and the supports 75 and 76 are coiled springs 77, 77ª and 78, which compensate for jars and vibrations between the tractor and the trailer. The springs 77ª are brought into action as cushioning springs as the tractor pulls on the trailer; the springs 77 when there is excess pushing of the trailer against the tractor, and the springs 78 serve to take up lost motion. The springs 78 are fully compressed if the trailer crowds the tractor beyond a certain limit, and during such compression the brakes may be brought into action.

Mounted in the support 75 is the lower end of a tubular king bolt 79 and the upper end of said tubular king bolt extends into the tubular upper end 80 of a gooseneck or overhanging arm 81 of the support 76. Encircling the tubular king bolt 79 and bearing on the support 75 is a conical expansion spring 82 and bearing on the upper convolution of said spring is the lower spool end 83 of a ball coupling member 84 which is slidable on the tubular king bolt 79 and adapted to be raised and lowered thereon to either engage in the socket coupling member 47 of the trailer or release said member. To reciprocate the ball coupling member on the tubular king bolt I employ a lever 85 and pivotally mount said lever on a transverse pin 86 carried by the arm 81, said arm having openings 89 providing clearance for the lever. The rear end of the lever has a fork 87 engaging in the spool end 83 of the ball coupling member 84; and the forward end of the lever 85 has a pad 88. This pad engages a depresion 90 of a yoke 91 which has its ends mounted on transversely alining shafts 92 and 93 provided with bushings 94 journaled in suitable bearings 95 carried by the lower face of the turn table or platform 67. The shafts 93 and 94 are rectangular in cross section and mounted on the shaft 93 is a crank 96 connected by a rod 97 to an uncoupling lever 98 located adjacent a driver's seat or in the cab of the tractor, said uncoupling lever being shown in Fig. 1 as being of a conventional form that may be manually operated. By shifting this uncoupling lever the yoke 91 may be turned to raise the pad 88, rock lever 85 and lower the ball coupling member 84 to release the socket coupling member 47. To prevent this from being accomplished before the trailer brakes are set and thus render the operation of the cab levers fool proof I provide one or both ends of the pin 86 with a bell crank 99 having a pad 100 engaging the yoke 91, and said bell crank is pivotally connected by a link 101 to a pivoted prop 102, said prop being pivotally supported from a plate 103 connected to the support 75 by a nut equipped U-bolt 104. The link 101 is connected to the pivoted end of the prop 102 by a coiled retractile spring 105 and the retractile force of the spring retains the pad 100 normally in engagement with the yoke 91. The upper end of the prop 102 is adapted to engage under the fork 85 or spool end 83 of the ball coupling member 84 and it is obvious that said ball coupling member cannot be lowered until the prop is lowered or placed in position to be lowered by the ball coupling member. By reference to Fig. 6 it will be noted that the pad 100 engages the yoke 91, whereas the pad 88 is above the depressed portion 90 of the yoke and consequently the bell crank 99 is actuated in advance of the lever 85, therefore, the prop 102 will be moved to a lowered position before the ball coupling member 84 is lowered. This is part of the safety device which prevents uncoupling without the trailer brakes first being applied, and the other part of the safety device will appear as the brake mechanism of the tractor is hereinafter described.

Slidable in the tubular king bolt 79 is a brake actuating pin 106 which has its upper end protruding from the tubular king bolt 79 to engage the shoe 57 of the sector rack 56 forming part of the brake mechanism of the trailer. The lower end of the pin 106 normally rests on a foot 107 of a bell crank 108 mounted on a transversely disposed rock shaft 109, journaled in bearings 110 of the support 75. The support 75 and the lower end of the tubular king bolt 79 are cut away, as at 111, to provide clearance for the foot 107 of the bell crank 108. Normally engaging the upper end of the bell crank 108 is a yoke 112 supported by the inner ends of transversely alining shafts 113 and 114 mounted in bushings 115, journaled in suitable bearings carried by the lower face of the turn table or platform 67. The shafts 113 and 114 are rectangular in cross section and mounted on the shaft 114 is a crank 116 connected by a rod 117 to a conventional form of brake lever 118, said brake lever being in proximity to the uncoupling lever 98 and said brake lever may be set in an adjusted position. By shifting the brake lever 118 the yoke 112 can be rocked to actuate the bell crank 108, raise the pin 106 and cause the sector rack 56 and lever 54 to be shifted to set the trailer brakes.

Mounted on the shaft 113 is an angular stop member 119 adapted to engage the lower end of a trigger member 120 loosely mounted on the shaft 113. The trigger member 120 is normally held in engagement with the stop 119 by a spring 121 and said trigger member extends under a long crank 122 carried by the shaft 92. There is sufficient play between the crank 122 and the trigger member 120 to permit of the trailer brakes being manually applied, or by the trailer crowding the tractor. With the trigger member 120 under the crank 122, the shaft 92 cannot be rocked to lower the ball coupling member 84 until the trigger member 120 is removed from under the end of the crank 122, and this can be only accomplished by first rocking the shaft 113 which is part of the brake setting mechanism, consequently there is no danger of a tractor driver grabbing the wrong lever and releasing the trailer before the trailer brakes are applied.

Clamped on the tubular king bolt 79, under the tubular upper end 80 of the arm 81, is a keeper 123 for the drag member 63.

Considering the operation or use of the tractor trailer combination and assuming that the trailer is connected to the tractor, as shown in Fig. 1, the socket coupling member 47 fitting over the ball socket member 84 connects the tractor to the trailer so that the former may pull, push, turn and control the latter. When traveling, the draft appliance of the tractor compensates for any jars or vibrations in a longitudinal direction, between the two vehicles, and when bringing the tractor to a standstill the brakes may be applied on the trailer as well as on the tractor. Manual application of the trailer brakes may be accomplished by shifting the brake lever 118, yoke 112, bell crank 108, pin 106, sector rack 56, lever 54 and pawl 55, shaft 51 and crank 52, rod 15, shaft 12 and rods 10.

Uncoupling of the tractor is conditioned upon the trailer brakes being applied, and with the trigger member 120 providing clearance for a downward swing of the crank 122, operation of the lever 98 and rod 97 rocks the yoke 91, first actuates the bell crank 99 to lower the prop 102 or places it in position to be lowered by the ball coupling member 84, and then actuates the lever 85 to lower the ball coupling member 84 against the action of the spring 82. This having been accomplished the driver now starts to move the rear end of the tractor from under the forward end of the trailer. Since the keeper 123 fits down over the drag member 63, this drag member and the locking bar 37 will be pulled forwardly, imparting sufficient impetus to the supporting leg to cause the same to descend by gravity and place the wheels 22 in position for engaging the ground. As the locking bar 37 is pulled forwardly the roller 59 is raised from the depression 60 of the head 61 and the locking bar 37 slides under the roller thus maintaining the sector rack 56 elevated and the trailer brakes applied or more firmly set. As the keeper 123 moves off of the socket coupling member 47 the drag member 63 is eventually carried forward from the socket coupling member and said drag member swings downwardly to a suspended position, as shown in Fig. 3. Possibly the driver has released the uncoupling lever, if so the expansive force of the spring 82 raises the ball coupling member 84 to normal position, it having cleared the socket coupling member 47 by this time.

The trailer wheels or casters 46 are now descending the inclined rails at the rear end of the tractor and in doing so the weight of the forward end of the trailer is thrown on to the supporting leg, consequently the shaft 29 engages in these notches 18 above said shaft, the exact set of notches depending on the elevation of the ground which the wheels 22 have engaged. With the shaft 29 engaging in notches of the inclined ways 16 the supporting leg cannot slip upwardly due to the weight of the trailer and said trailer is sufficiently supported with the brakes set against accidental movement.

Should it be necessary to move the trailer about, for instance to distribute a load at different places the brake lever 54 can be manipulated to release the brakes of the trailer. This is permissible because the brake lever 54 and the shaft 51 can be operated independent of the sector rack 56 which is loose on the shaft 51 and supported by the extended locking bar 37.

Assuming that the brakes are set on the trailer and that the trailer is to be coupled to the tractor the rear end of the tractor is backed under the forward end of the trailer. The trailer being held by its set brakes, the rails 69 encounter the wheels or casters 46 and the tubular portion 80 of the arm 81 encounters the head 61 of the locking bar 37. The suspended drag member 63 also encounters the forward beveled end of the socket coupling member 47 and said drag member is raised to a horizontal position to engage under the keeper 123.

The ball coupling member 84 having been previously actuated by the driver of the tractor, the prop 102 left in a lowered or partially lowered position, and the brake lever 118 set in normal position with the pin 106 lowered, the prop 102 will be actuated independent of the lever 98, as the ball coupling member encounters the forward beveled end of the socket coupling member 47. Even though the brake lever 118 has not been set, the pin 106 can be depressed by the shoe 57 of the sector rack 56. The king bolt 79 rides into the slot 49 of the socket coupling member and the ball coupling member 84 is depressed to eventually snap into the socket 48 of the socket coupling member 47. While this is taking place the upper end of the arm 81 is pushing rearwardly on the locking bar 37 and the wheels or casters 46 are riding on to the turn table or platform 67. The forward end of the trailer is therefore being elevated, raising the notches 18 relative to the shaft 29 so that the notches 18 clear the shaft and the rollers 30 engage the inclined ways 16. The supporting leg is therefore unlocked relative to the inclined ways 16 and rearward movement of the locking bar 37 causes the diverging member 43 to push the supporting leg upwardly to the raised position shown in Fig. 1. It is in this raised position that the supporting leg is safely held on account of the locking bar 37 abutting the upper end of the arm 81, and since the locking bar 37 has been moved rearwardly the sector rack 56 has been brought into position for the shoe 57 to engage over the pin 106 and the roller 59 to engage in the depression 60 of the locking bar head 61, releasing the brakes of the trailer.

Considering the tractor trailer combination descending a grade, any tendency of the trailer to crowd or push the tractor is eliminated to a great extent by the brakes of the trailer being applied. This is brought about through the supports 75 and 76 being shifted forwardly on the draft appliance, and by considering Fig. 6, it will be noted that the support 75 will carry the bell crank 108 forward. Since the yoke 112 is supported from the turn table or platform 67, the upper end of the bell crank 108 will ride against the yoke 112 causing the foot 107 of the bell crank to raise the pin 106 and apply the trailer brakes. If previously applied through coupler from tractor, such applied brakes will be more firmly applied by any overrunning action of the trailer. The advantages of this has been appreciated by the operators of my tractor trailer combinations when encountering ruts or gulleys.

The turn table or platform 67 and the wide rails 69 permit of the tractor being backed under the trailer when the tractor is at an angle relative to the trailer, and it is obvious that the trailer can be backed into a pavement curb and the tractor turned at a right angle to the trailer so as not to obstruct traffic on a street.

Backing the trailer by the tractor may cause the springs 77 and 78, particularly the latter, to be compressed, but without destroying the operative relation of the coupling or braking mechanism, by reason of the large pads 88 and 100.

Before backing the trailer by the tractor, if the brake operating lever 118 of the tractor has not been set in a forward position from that shown in Fig. 1, so that the yoke 112 is shifted away from the bell crank 108, the crank will follow the yoke 112 by reason of the weight of the pin 106. This movement is permissible by reason of the coupler being moved forward and consequently there is such freedom of the bell crank 108, carried by the tractor independent of the draft appliance, that the brakes of the trailer are not applied because of any backing of the tractor. However, the brakes of the trailer can be applied after the trailer has been backed to a desired location.

What I claim is:—

1. The combination with a tractor and trailer detachably engageable at will, of coupling means for said tractor and trailer, said coupling means comprising a coupling member on the trailer, a coupling member on the tractor, the tractor coupling member being movable longitudinally of the tractor and adapted to be raised and lowered on the tractor for engagement with and disengagement from the coupling member of the trailer, the trailer coupling member being operative to limit the raising movement of the tractor coupling member during the coupling operation and while the members are coupled.

2. The combination set forth in claim 1, and means on the tractor adapted to engage under the tractor coupling member to retain it in engagement with the trailer coupling member.

3. Coupling means for a tractor trailer combination comprising a trailer socket member, a tractor ball member adapted to be moved into and out of the trailer socket member, automatic means for moving said ball member into said socket member, and manually operated means for moving said ball member out of said socket member.

4. Coupling means as called for in claim 3, and means adapted to engage said ball member to retain it in said socket member.

5. The combination of a tractor, a trailer, coupling means permitting of said tractor and trailer being connected and disconnected at will, brakes for the trailer, brake operating mechanism on the tractor adapted for operating the trailer brakes, and means associated with said brake operating mechanism to prevent disconnection of said tractor and trailer until said trailer brakes are applied.

6. In a tractor trailer combination wherein the trailer and tractor are coupled together for combined service operation and disengageable to permit independent service, and wherein the trailer may be maintained in position when in independent service; a shiftable support for the forward end of the trailer, a bar for shifting said support, said bar being directly engageable by the coupling of the said trailer and tractor to shift said support in one direction, and means carried by said bar and engageable and disengageable relative to said coupling by bar movement for shifting said bar in an opposite direction.

7. A tractor trailer combination as called for in claim 6, wherein the support moves to an active position by gravity and has impetus imparted thereto by the last mentioned means.

8. In a tractor trailer combination, a trailer having a brake mechanism, a tractor, a draft appliance carried by said tractor, a coupler on said draft appliance permitting of said tractor and trailer to be coupled and uncoupled at will, and a brake operating mechanism on said tractor brought into operative relation to the trailer brake mechanism when the tractor and trailer are coupled, said brake operating mechanism having a portion thereof movable with said draft appliance to apply the brakes of the trailer when the trailer attempts to override the tractor.

9. A tractor trailer combination as called for in claim 8, wherein the brake operating mechanism is operatable through the coupler and the trailer part of said brake mechanism is movable with the tractor part of the brake mechanism on the draft appliance to cause the brakes of the trailer to be applied.

10. The combination with a tractor and a trailer detachably engageable at will, of a coupling member on the trailer, a coupling member on the tractor adapted to be raised and lowered relative to the trailer coupling member for attaching and detaching said trailer, a prop adapted to engage under the tractor coupling member, and means for raising and lowering said tractor coupling member, said means being articulated to said prop to cause adjustment thereof in advance of said tractor coupling member being lowered.

11. The combination called for in claim 10, wherein said means includes a lever for shifting the tractor coupling member, and a yoke engaging said lever and adapted to operate said lever in advance of said prop.

12. The combination of a tractor, a trailer, an arm on said tractor, a king bolt having its upper end held by said arm, a coupling member on said trailer movable into engagement with said king bolt, a tractor coupling member slidable on said king bolt and adapted to be shifted upwardly under said trailer coupling member to effect coupling of said tractor and trailer, and means on said tractor adapted for shifting said tractor coupling member.

13. The combination called for in claim 12, wherein said trailer coupling member is in the form of a socket having a slotted wall to receive said king bolt, and said tractor coupling member is in the form of a ball spring pressed in said socket.

14. The combination of a tractor, a trailer, a brake mechanism for the trailer, a socket coupling member carried by said trailer, a ball coupling member carried by said tractor and adapted to engage in said socket coupling member and connect said tractor and trailer, and brake operating means on said tractor operatable axially of said coupling members for controlling the trailer brake mechanism, said trailer brake mechanism including a lever by which said trailer brake mechanism may be actuated independent of the tractor brake mechanism.

15. The combination of a tractor, a trailer, a brake mechanism on said trailer, a brake operating mechanism on said tractor, and means detachably connecting said tractor and trailer, the brake operating mechanism of the tractor being operatable axially of said means, and the brake mechanism of said trailer including a control element operatable independent of the brake operating mechanism of the tractor.

16. The combination of a tractor, a trailer, a platform on said tractor supporting the forward end of the trailer, coupling means coaxially of said platform for connecting said tractor and trailer, and means operatable from under said platform for controlling said coupling means.

17. The combination called for in claim 16, and brake mechanism for the trailer, and means operatable from under said platform and axially of said coupling means for actuating said trailer brake mechanism.

18. The combination of a trailer having a rear axle assembly, a shiftable leg supporting the forward end of the trailer from the ground, a bar protruding from the forward end of the trailer and adapted to be pushed rearwardly to shift said leg, a tractor adapted to have its rear end backed under the forward end of the trailer and engage said bar to cause elevation of said leg, and coupling means for said tractor and trailer, said coupling means being of the ball and socket type.

19. In a tractor trailer combination wherein the tractor and trailer are detachably engageable at will, coupling and uncoupling means for the tractor and trailer, braking means for the trailer operatable from the tractor, and means associated with said braking means to prevent operation of the uncoupling means in advance of the braking means.

20. The combination called for in claim 19, wherein the last mentioned means includes a crank movable with the uncoupling means and a trigger member movable with the braking means.

21. In a tractor trailer combination, a trailer having a brake mechanism, a tractor, a coupler movable on the tractor permitting of said tractor and trailer being coupled and uncoupled at will, and means for operating said brake mechanism, said means having a portion thereof movable with said coupler to apply the trailer brakes when the trailer attempts to override the tractor.

22. In a tractor trailer combination wherein the tractor and trailer are coupled together for combined service operation and disengageable to permit independent service, and wherein the trailer may be maintained in position when in independent service; a shiftable support for the forward end of the trailer, shifting means for said support, said shifting means being engageable by the coupling of said trailer and tractor to shift said support in one direction, and means associated with said shifting means engageable and disengageable relative to said coupling for shifting said shiftable means in an opposite direction.

23. In tractor trailer combinations, wherein a tractor and trailer are coupled together for combined service and disengageable by uncoupling for independent service, and wherein the coupling and uncoupling operations are rendered active by relative movement of tractor and trailer in the direction of traction, a brake mechanism for the trailer, said mechanism being operable at will when the tractor and trailer are coupled, and means carried by the trailer and normally inactive when the tractor and trailer are coupled and rendered active by the relative movement of tractor and trailer for setting said brake mechanism and normally maintaining the mechanism in its set condition during the perod when the tractor and trailer are separated.

24. A combination as in claim 23 characterized in that the means has a coupled relation with the tractor while the tractor and trailer are coupled.

25. A combination as in claim 23 characterized in that the means has a coupled relation with the tractor while the tractor and trailer are coupled and during a predetermined period during the coupling and uncoupling operations.

26. A combination as in claim 23 characterized in that the means has a coupled relation with the tractor independent of that produced by the main coupling structure of the tractor and trailer, both coupling structures being active concurrently.

27. A combination as in claim 23 characterized in that the means has a coupled relation with the tractor independent of that produced by the main coupling structure of the tractor and trailer, both coupling structures being active concurrently, with the means coupled relation maintained during a predetermined period of the uncoupling operation of the main coupling structure.

28. A combination as in claim 23 characterized in that the means has a coupled relation with the tractor independent of that produced by the main coupling structure of the tractor and trailer, both coupling structures being active concurrently, with the means coupled relation established prior to the completion of the coupled relation of the main coupling structure.

29. A combination as in claim 23 characterized in that the means has a coupled relation with the tractor independent of that produced by the main coupling structure of the tractor and trailer, both coupling structures being active concurrently, with the means coupled relation established during a predetermined period in the development of the coupling operation of the main coupling structure.

30. A combination as in claim 23 characterized in that the means includes an instrumentality co-operative with the brake mechanism to produce brake activity and inactivity by relative movement of tractor and trailer in the direction of traction.

31. A combination as in claim 23 characterized in that the means includes an inclined face adapted to co-operate with the brake mechanism during relative movement of the tractor and trailer in the direction of traction, said face being normally inactive relative to the brake mechanism and adapted to produce braking activity when rendered active with the brake mechanism during such relative movement of the tractor and trailer.

32. In tractor and trailer combinations, a tractor, a trailer, brake mechanism for the trailer operable at will from the tractor when the tactor and trailer are coupled for combined service and independent of the tractor when the tractor and trailer are uncoupled for independent service, and means operative to set the brakes automatically by relative movement of tractor and trailer in the direction of traction and to maintain the set condition of the brakes when the tractor and trailer are separated, said means being rendered inactive for automatic setting of the brakes during periods when the brakes are set manually from the tractor and rendered active to maintain the brakes in set condition by the uncoupling operation of the tractor and trailer.

33. The combination of a tractor, a trailer adapted to be moved by said tractor, brakes for said trailer, a sector rack adapted to operate said trailer brakes, tractor means for setting said trailer brakes, and means releasable by withdrawal of said tractor from said trailer to maintain the trailer brakes set.

34. The combination set forth in claim 33, wherein said sector rack permits of said brakes being released independent of the last mentioned means.

35. The combination of a tractor, a trailer, brakes for said trailer, coupling and uncoupling mechanism for said tractor and trailer, a brake mechanism operable at will through said coupling and uncoupling mechanism for controlling the brakes of said trailer, and means set in operation by uncoupling said tractor relative to said trailer to set the trailer brakes.

36. The combination set forth in claim 35, wherein said means includes a locking bar articulated with said tractor to be moved thereby a brake setting distance and then be automatically disconnected from said structure.

37. In a tractor trailer combination wherein the tractor and trailer may be coupled together and uncoupled at will, coupling means for said trailer and tractor, brakes for said trailer, said brakes being operable at will through said coupling means and automatically set when said tractor is uncoupled from said trailer, and means to effect such setting of the trailer brakes when said tractor is uncoupled from said trailer, said means being releasable at will when said trailer is free from said tractor.

38. A tractor trailer combination as set forth in claim 37, wherein the last mentioned means is articulated with the tractor to be actuated thereby for a brake setting distance and then be automatically disconnected from the tractor.

39. In a tractor trailer combination, a tractor, a trailer, a brake mechanism for the trailer operable either from the tractor or independent thereof, and means for causing said tractor to automatically apply the trailer brakes, said means being engageable with the tractor for a predetermined time during relative disengagement movement of the tractor and trailer and eventually released by such movement with the trailer brakes set.

40. Brake operating means comprising a pivoted member which when rocked is adapted to apply brakes, a reciprocable member adapted to ride under said pivoted member, tilt said pivoted member, and hold the brakes applied, and means adapted to reciprocate said reciprocable member.

41. Brake operating means as called for in claim 40, and means associated with said pivoted member adapted for releasing the brakes independent of said pivoted member.

42. Brake operating means as called for in claim 40, and means engaging said pivoted member adapted to rock said pivoted member at will and independent of said reciprocable member.

43. A tractor, a trailer, brakes for the trailer, a drag member on the trailer adapted to be pulled by the tractor to cause the trailer brakes to be applied, and means supporting said drag member on the trailer adapted to assume a position to retain the trailer brakes set.

44. Trailer brake mechanism as called for in claim 43, wherein the drag member supporting means assumes a position to be actuated by the tractor to eventually release the brakes.

In testimony whereof I affix my signature in presence of two witnesses.

SIDNEY B. WINN.

Witnesses:
CHARLES W. STAUFFIGER,
KARL H. BUTLER.